United States Patent
Fletcher et al.

(10) Patent No.: US 7,694,344 B1
(45) Date of Patent: Apr. 6, 2010

(54) METHOD AND SYSTEM FOR ENFORCING NETWORK SECURITY BY PRESERVING EVENT EXECUTION INFORMATION UTILIZING A SERVICE EVENT STACK

(75) Inventors: Samuel F. Fletcher, Orem, UT (US); Dale Lowry, Springville, UT (US); Pat Felsted, Cedar Hills, UT (US); David Pratt, Woodland Hills, UT (US)

(73) Assignee: Novell, Inc., Provo, UT (US)

( * ) Notice: Subject to any disclaimer, the term of this patent is extended or adjusted under 35 U.S.C. 154(b) by 2352 days.

(21) Appl. No.: 10/229,730

(22) Filed: Aug. 28, 2002

Related U.S. Application Data

(60) Provisional application No. 60/365,376, filed on Mar. 15, 2002.

(51) Int. Cl.
G06F 17/30 (2006.01)
H04N 7/16 (2006.01)

(52) U.S. Cl. .......................................... 726/28; 726/22

(58) Field of Classification Search .................. 726/22, 726/28, 1; 719/318
See application file for complete search history.

(56) References Cited

U.S. PATENT DOCUMENTS

| | | | | |
|---|---|---|---|---|
| 5,010,482 | A * | 4/1991 | Keller et al. ................... | 710/52 |
| 5,555,415 | A | 9/1996 | Allen | |
| 5,905,890 | A | 5/1999 | Seaman et al. | |
| 5,946,467 | A | 8/1999 | Pathakis et al. | |
| 5,951,648 | A | 9/1999 | Kailash | |
| 6,158,007 | A * | 12/2000 | Moreh et al. ................... | 726/1 |
| 6,167,431 | A | 12/2000 | Gillies et al. | |
| 6,185,613 | B1 | 2/2001 | Lawson et al. | |
| 6,226,746 | B1 | 5/2001 | Scheifler | |
| 6,230,198 | B1 | 5/2001 | Dawson et al. | |
| 6,279,046 | B1 * | 8/2001 | Armstrong et al. ............. | 710/5 |
| 6,292,825 | B1 | 9/2001 | Chang et al. | |
| 6,321,338 | B1 * | 11/2001 | Porras et al. ................... | 726/25 |
| 6,484,203 | B1 * | 11/2002 | Porras et al. ................. | 709/224 |
| 6,643,682 | B1 * | 11/2003 | Todd et al. ................... | 709/202 |
| 6,895,586 | B1 * | 5/2005 | Brasher et al. ............... | 719/313 |
| 6,944,662 | B2 * | 9/2005 | Devine et al. ................ | 709/225 |
| 7,143,392 | B2 * | 11/2006 | Ii et al. ........................ | 717/125 |
| 7,174,363 | B1 * | 2/2007 | Goldstein et al. ............ | 709/203 |
| 2003/0056199 | A1 * | 3/2003 | Li et al. ....................... | 717/127 |

OTHER PUBLICATIONS

Slominski et al., "An Extensible and Interoperable Event System Architecture Using SOAP," Department of Computer Science, Indiana University, Bloomington, IN Feb. 23, 2002.

\* cited by examiner

*Primary Examiner*—Kimyen Vu
*Assistant Examiner*—Thomas Gyorfi
(74) *Attorney, Agent, or Firm*—Haynes and Boone, LLP

(57) ABSTRACT

A method and system is disclosed for enhancing network security by using a service entry stack in a distributed computer network. After an event system receives an indication for a publisher to publish a first event to a subscriber list of one or more event subscribers, authorization concerns are examined for publishing the first event to each event subscriber by sequentially examining each event subscriber in the subscriber list. When publishing the first event to the event subscriber, a service entry stack is utilized for recording event execution information and process hierarchy of the distributed computer network so that such information can be used for enhancing the security of the distributed computer network.

12 Claims, 2 Drawing Sheets

METHOD AND SYSTEM FOR ENFORCING NETWORK SECURITY BY PRESERVING EVENT EXECUTION INFORMATION UTILIZING A SERVICE EVENT STACK

CROSS REFERENCE

The present application claims the benefit of U.S. Provisional Patent Application filed on Mar. 15, 2002, having Ser. No. 60/365,376.

BACKGROUND OF THE INVENTION

The present invention relates generally to distributed computer network systems, and more particularly, to a method and system for enforcing network security by preserving and utilizing execution information in a service entry stack.

A distributed computer network system typically comprises a large number of individual nodes, such as workstations, PC's, terminals, host computers, and data storage components, which are tied together across a network. Also, the distributed network system may comprise remotely located clients tied together to utilize common data storage components and to share processing power of multiple nodes. The distributed computer network complicates the management of transactions because of the fact that transactions or events are happening independently or dependently at different locations. In view of various operations happening in the distributed computer network, the management of the data transactions and the security thereof is a critical element of the operation of the network.

In the distributed computer network system, various applications are somewhat related. For a particular process, one or more events may happen in the system, and they may be related. For example, a particular triggering event happening in one application may affect the operation of others or trigger a new series of operations (therefore, more events) in other applications. For example, if there is an application that maintains the current employee list in a company, if one employee leaves the company, the human resources personnel may want to delete the information about the leaving employee from the employee list. Accordingly, this application performs its own internal logic for removing the departing employee from the list. After this change is made to the list, other applications may have to take various actions. For instance, the current application needs to notify other applications operated by the security department to take away all this departing employee's authorized access rights, including deactivating his badge, applications operated by the telephone department to block his extension and voice mail, applications operated by the IT department to bounce his emails with a necessary notification message. As such, the inter-relation among various applications/events makes the management of the distributed network system hard to manage, especially for the security concerns.

One important issue is how one application needs to notify other related applications about an event that has a common concern, and how these applications could work together. In other words, to synchronize all the applications running on a distributed system and control the security measures in a systematic way is a practical challenge. It is known in the art, that one way to solve this problem would be to have a central database storing information about which recipients ("subscribers") care about which notifications ("events") from which senders ("publishers"). In this central database, a subscriber should specify which events it cares about, or which publishers it cares about receiving an event from. On the other hand, a publisher wanting to announce an event to all interested parties can easily find all the subscribers in the database. The publisher could examine the subscriber list in the database and perform some filtering logic to decide which of the subscribers who wanted to be notified should actually be notified of the event.

As it is known, the events published in the distributed network may need to be secured for various reasons. Maintaining data integrity and security is, in general, a major aspect of today's computer network. What is needed is an efficient method for enforcing network security in a distributed network with event based processing systems.

SUMMARY OF THE INVENTION

A method and system is disclosed for enhancing network security by using a service entry stack in a distributed computer network. After an event system receives an indication for a publisher to publish a first event to a subscriber list of one or more event subscribers, authorization concerns are examined for publishing the first event to each event subscriber by sequentially examining each event subscriber in the subscriber list. When publishing the first event to the event subscriber, a service entry stack is utilized for recording event execution information and process hierarchy of the distributed computer network.

The present disclosure enhances the network security by providing a service entry stack within an event system, which provides access to an event workflow. The stack entries include information such as who publishes the event, who subscribes to the event, who is about to receive the event, and what series of workflow steps have produced the current state, etc.

DESCRIPTION OF THE PREFERRED EMBODIMENT

Figure 1:
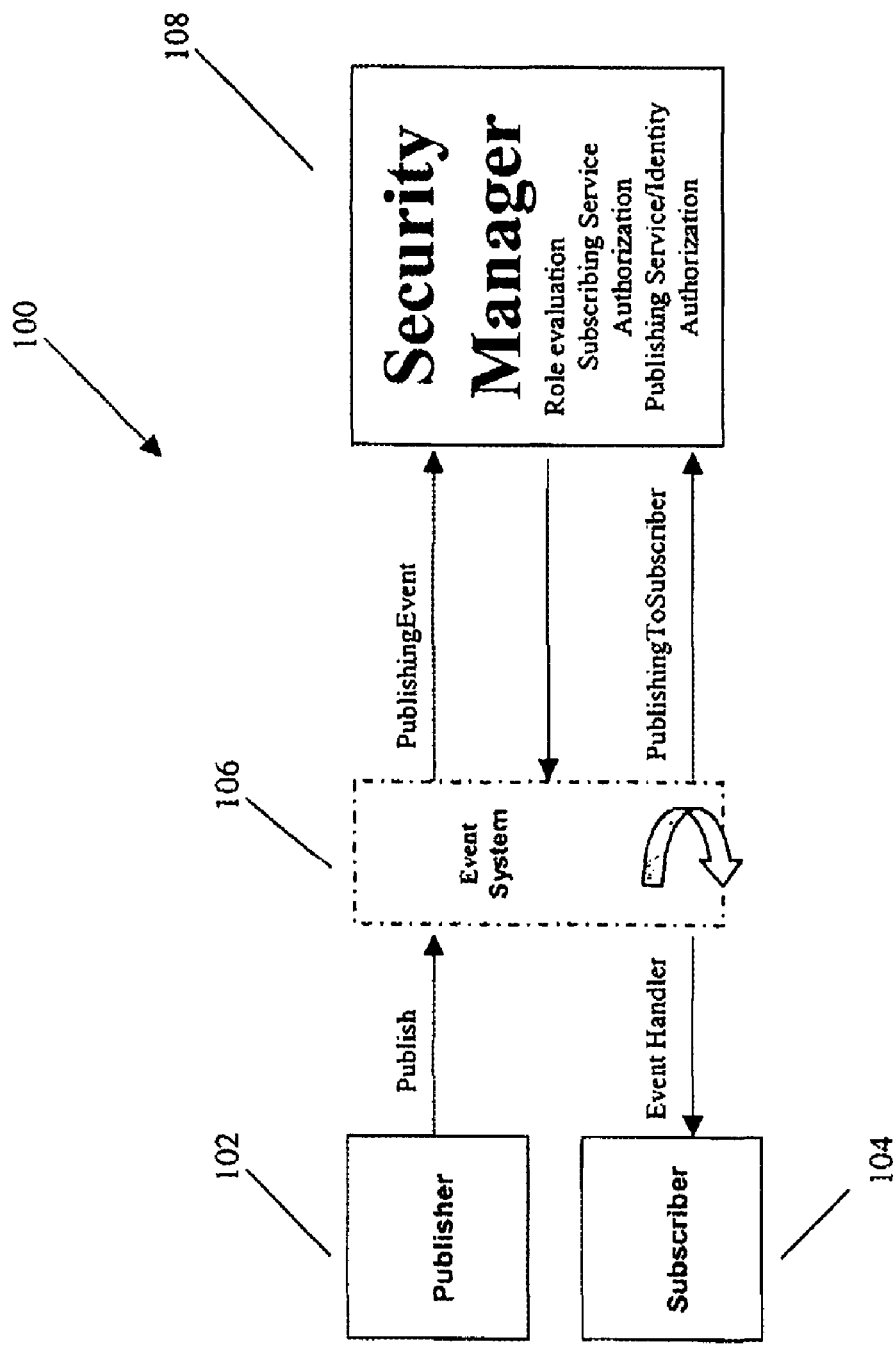
FIG. 1 shows a block diagram for an event security system in the distributed computer network system.

In a distributed computer network, an event system is an operating system service that deals with the matching and connection of publishers and subscribers. An event is a single call to a method on a predetermined interface, originated by a publisher, and delivered by an event service to the correct subscriber or subscribers. A publisher is any program that makes the calls that initiate events, and a subscriber is a component that receives the calls representing events from a publisher. The subscriber implements an interface as a server, and the publisher makes calls on it as a client. The event service keeps track of which subscribers want to receive the calls and may direct the calls to those subscribers without requiring specific knowledge by the publisher.

The connection between a publisher and a subscriber is represented by an event class. An event class is a component, synthesized by the event system, containing the interfaces and methods a publisher will call to fire events and that a subscriber needs to implement if it wants to receive events. The interfaces and methods provided by an event class are called event interfaces and event methods. Interfaces and methods an event class contains can be provided by a type library. Event classes are stored in a catalog, placed there either by the publishers themselves or by administrative tools.

If a subscriber is interested in receiving events from a publisher, it should register a subscription with the event system. A subscription is a data structure that provides the event system with information about the recipient of an event. It specifies which event class and which interface or method within that event class to call when the event occurs, which events the subscriber wants to receive and filters specifying specific conditions under which the subscriber wants to receive the event. Subscriptions can be stored in a predetermined database such as the catalog.

When a publisher wants to publish or fire an event, it uses the standard object-creation functions to create an object of the desired event class. This object, known as an event object, contains the event system's implementation of the requested interface. The publisher then calls an event method that it wants to fire to the subscribers.

Inside the event system, the event system finds all the subscribers that have registered subscriptions to that interface and method. The event system then connects to each subscriber and calls the specified method. The event system in a distributed computer network system may use an eXtensible Markup Language ("XML") application program interface ("API"). The interface may include at least one event which defines an object. The XML integration services framework provides a flexible, cross-protocol, cross-language API for distributed systems such as a directory-enabled application system by providing both a high level of interactivity and modular dynamic components with an object model.

In the distributed network systems, in some implementation, some secure events are provided by incorporating service entry stacks and multiple security event publications into a common services framework. Taking an XML-based services framework as an example, in processing XML events, whether they were triggered by a SOAP request or some other means, additional events are often triggered as well. As it is known in the industry, SOAP is an object-oriented, Internet based protocol for exchanging information between applications in a distributed environment. The SOAP specification defines the format of data to be in XML. For example, in a componentized architecture, an event may come from an HTTP stack, through a SOAP handler, to a handling service, which then triggers an additional event which is secured using a higher grade authentication mechanism. Such comprehensive event flow information can be preserved in an event process stack such as a service entry stack including authentication information and methods, workflow paths, etc. This information could help to enhance the security of the system by providing the event system an update on all related events and even providing an opportunity to modify authorization criteria in a real time fashion. For example, the event system along with the service entry stack can determine whether the publisher is external to the process (HTTP and SOAP), whether there are security headers, a higher grade authentication, or whether the events have traversed through an insecure path in the workflow. The stored information may be useful for authorizing subsequent event publication and processing, content exposure, and component interaction. Therefore, there is a grave need to preserve the event's processing history in order to authorize subscription, provide auditing, or determine proximity, etc. in the distributed computer network system.

FIG. 1 illustrates a block diagram for an event security system 100 in the distributed computer network system. The system has at least one publisher 102 and at least one subscriber 104. Through an event system 106 and a security manager 108, the security or authorization concerns of the publication and subscription of the events are contemplated and resolved. Since the security concerns of a distributed network depends largely on the hierarchy of the network and its processes, an event system must closely reflect the structure of the hierarchy. For example, a distributed computer network system's hierarchy may have separate servers at local sites reporting to a regional server and coupled to the regional server, and have separate servers at the regional sites reporting to an area headquarter and coupled to the area headquarter server, etc. If an event at a "local" server is of sufficient importance that it should be reported to the region and/or to the area headquarters, the event may be reported by sending it from the local server to the region server and then to the area server for distribution to receivers at the region and area. A similar hierarchical structure exists for all the processes of the distributed computer network. It is well known that a "tree" form internal process architecture may exist for managing various events and processes happening within the distributed computer network system.

When an event publisher 102 publishes an event, the event is received by an event processing engine of the event system 106 before it gets sent out to the destined subscribers. In one example, the publication of this event is noted by sending an "event being published" security event to the security manager 108. The publisher passes on to the event system a subscription list which is editable by a security event handler of the security manager 108. The security manager 108 goes through the subscription list and determines whether the event should be published to certain subscribers. Due to the nature of the complex hierarchical structure of the distributed system, the initial subscribers on the subscription list may not be the final receivers of the event. For example, when an event is processed by the first subscriber, and a series transactions/events may also be triggered. The result of these transactions may change the scope of authorization of the second subscriber in the list. This second subscriber may be barred, under certain condition, from receiving the publication while the publisher may initially think that the second subscriber can receive such event.

After the security manager and the event system approves event publishing to a particular subscriber, the event is handed to the designated subscriber by calling its event handler, and relative event information (e.g., subscriber identification information) is pushed onto an service entry stack of the event system together with the event itself and associated objects and security information. The event system and the security manager may contain security event handlers that can modify subscriptions, terminate event processing, modify the event, or extend information in the service entry stack (such as adding additional security information). The service entry stack can also be tunneled in a distributed environment by including the service entry stack in protocol headers (such as SOAP, SMTP, or HTTP headers) thus continuing the stack and workflow processing information across the distributed computer network system.

For illustration purposes below, several terms are defined below as they will be used in the description along with FIG. 2. First, a PublishingEvent event allows a security service of the security manager to determine if the publisher is authorized to publish the event as well as determining if, given the publisher's profile, the initial subscribers are allowed to receive the event from the perspective of the security manager. The PublishingEvent event includes a reference to the event being published, the subscriber list, and a reference to a predetermined service entry stack. Subscribers can be added and/or removed from the subscriber list by the security service, and the event can be terminated by the event system or the security manager if desired.

A PublishingToSubscriber event allows a security service of the security manager to enforce security criteria for each subscriber, while the authorization may depend on results from previous subscribers. The PublishingToSubscriber event includes a reference to the event being published, a reference to the subscriber, and a reference to the service entry stack. The event can be terminated by the security service if desired. In implementation, services are independent application modules that may be dynamically configured and invoked. For example, they can be a DLL, an NLM, a Java class, or an IP address and port. The event system may represent these components with a service object that is known by a service ID. Each time a service event handler is invoked, an entry will be pushed onto the service entry stack. On the other side, when the event handler returns, the entry is popped off the stack. The stack entry will include the event service ID, a reference to the event, and objects to be handled. Information can be associated with stack entries, such as user identity, authorization, etc. For example an HTTP service can associate information from the HTTP headers such as cookies, etc. with the stack entry. For illustration purposes, the subscribers to the PublishingEvent event and PublishingToSubscriber event are referred to as security subscribers since they mainly examine the authorization and security concerns for publishing an event by a publisher, while the target recipient for the publisher to publish an event is referred as event subscribers.

Figure 2:
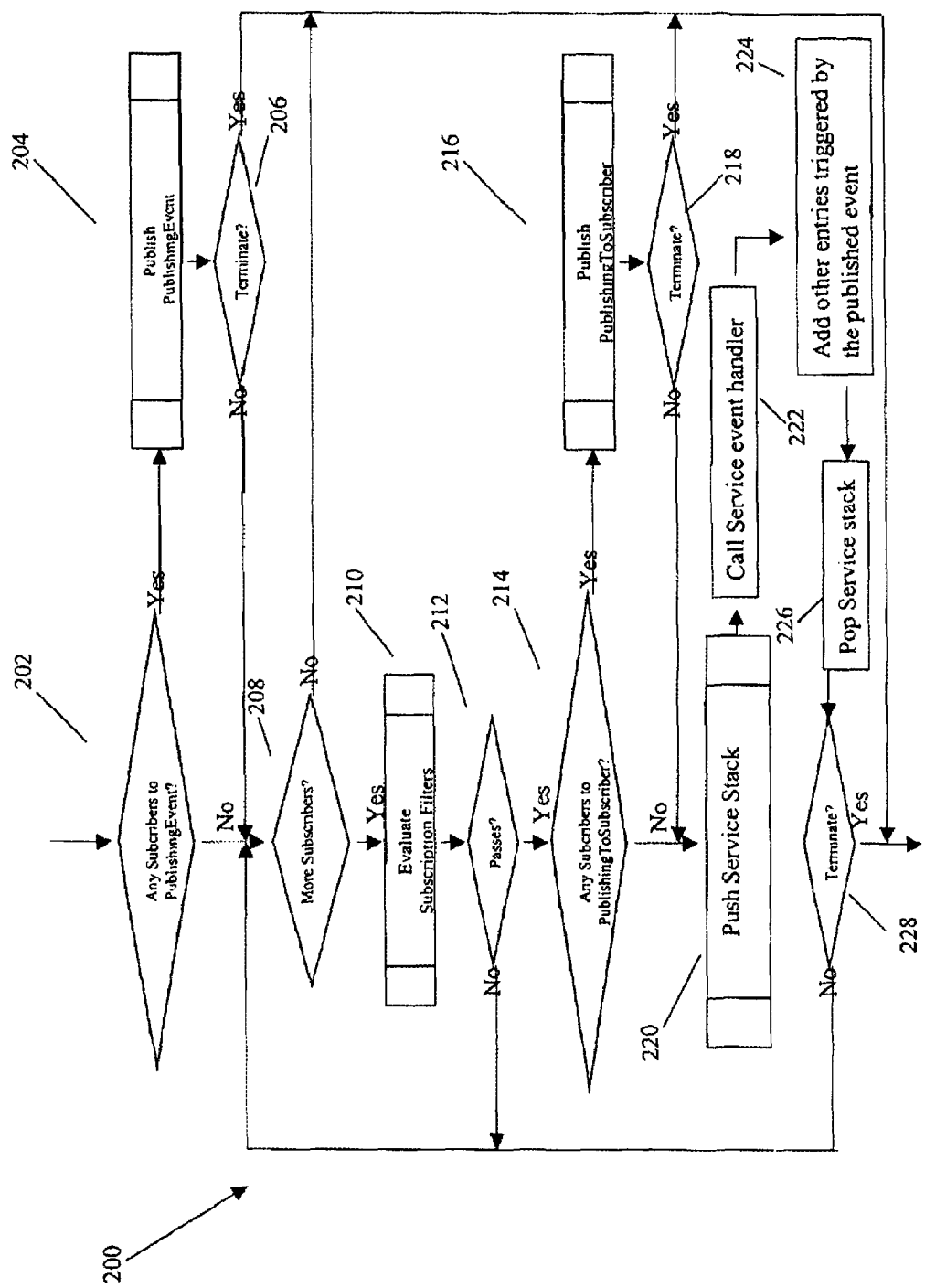
FIG. 2 shows a flow diagram for enhancing event security utilizing a service entry stack of the event system.

FIG. 2 illustrates a flow diagram 200 for enhancing event security utilizing a service entry stack of the event system. In step 202, when a publisher wishes to publish a first event, a notification is sent to the event system indicating that it wishes to publish the first event to certain event subscribers. The event system first checks to see whether there are any security subscribers to a second event such as the PublishingEvent event. Usually, the security subscribers of the PublishingEvent event are provided in the event system configuration managed by the distributed computer network. For example, the security manager is one of the most likely security subscribers of the PublishingEvent event. If there is at least one such security subscriber to the PublishingEvent event, a PublishingEvent event will be published in step 204 from the event system to the intended first group of security subscribers such as the security manager. The PublishingEvent event carries information such as a reference to the first event being published, the subscriber list of the first event, and a reference to a predetermined service entry stack in the event system. In step 206, the security manager can terminate the event publishing process for the first event if certain conditions are met. For example, the security manager may check the entire subscriber list against an external database and find that based on some predetermined criteria, the first event should not be published to those parties. If the security manager does not stop the process at this point, a determination is made to see whether there are individual subscribers to be considered one after another by the security manager with regard to publishing the first event in step 208. The event system moves sequentially from the first one to the last one on the subscriber list. For illustration purposes, assuming the event system takes the first subscriber in the list, it evaluates subscription criteria pertaining to this particular subscriber in step 210. If the considered subscriber fails in the evaluation, the first event will not be published to the subscriber of concern (step 212), and the process routes back to step 208. Otherwise, the process moves to step 214 wherein it is determined whether there are security subscribers to a third event such as the PublishingToSubscriber event. Similar to step 202, this determination relies largely on the event system configuration of the distributed network. One type of likely security subscribers to the PublishingToSubscriber event are the security managers. It is possible that more than one security managers are the subscribers to this event. Other subscribers can be different applications such as a transaction logger, etc. This group of security subscribers will determine whether there are other authorization concerns other than those known to the event system for publishing the first event. After publishing the PublishingToSubscriber event to its security subscribers in step 216, similar to step 206, the security subscribers can terminate the process if certain conditions are met in step 218. If the process continues, an entry is created to be "pushed" onto the security entry stack in step 220. The entry indicates that the first event is published to the first event subscriber (the "First Entry"). In the mean time, in step 222 the event system calls a service event handler, which is a software module, for publishing the first event to the predetermined event subscriber. After the first event is published, and before the service event handler is returned to the event system, there could be one or more other transactions or events triggered by the published first event. An entry representing each such transaction or event is also "pushed" to the service event stack in step 224 reflecting the hierarchy of the processes in the distributed network. The pushed entries will be very useful for authentication or security purposes when a separate transaction triggered by the publication of the first event (or any other event afterwards) calls for the consideration of security concerns of that transaction. When the "ripple effect" caused by the first published event is done, the service event handler is returned to the event system, the pushed First Entry is now popped from the stack in step 226. Another determination is made to see whether the process can stop now in step 228 due to the exhaustion of the subscriber list. If not, the process routes back to step 208, and the second subscriber in the subscriber list is now under examination. It is noted that the security or authorization examining process is a loop itself. As such, in step 216, the authorization criteria pertaining to a particular subscriber may be changed by transactions done due to publishing the first event to the subscribers prior to the particular subscriber on the list. For example, when considering the second event subscriber, the authorization criteria may be changed after the first event was published to the first event subscriber. The security manager in step 218 thus has the freedom and the chance to change or modify the criteria accordingly. As such, the entire security mechanism for the distributed network is greatly improved. Moreover, the fact that the service entry stack reflects the hierarchy of the processes of the distributed network, a complex and up-to-date security mechanism is implemented.

The present disclosure enhances the network security by providing a service entry stack within an event system, which provides access to an event workflow. The stack entries include information such as who publishes the event, who subscribes to the event, who is about to receive the event, and what series of workflow steps have produced the current state, etc. The stack entries are available for parties such as the security manager to decide on security issues of other transactions while such entries have not been purged from the stack.

The above described enhanced security mechanism with a service entry stack can apply to various network computer products for securing the publishing and subscription to events. For example, some products need to provide role-based authorization of event publishing and subscription while others may need to provide for "Trusted services" that become authorized to publish and receive sensitive events if the subscribers can provide proper certificates. The service entry stack can greatly improve the security for such software products.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for enhancing network security by using a service entry stack in a distributed computer network, the method comprising:
   receiving, by an event system, an indication for publishing, by a publisher, a first event to an editable subscriber list of one or more event subscribers;
   using a processor to examine authorization concerns for publishing the first event to each event subscriber by sequentially examining each event subscriber in the subscriber list utilizing a service entry stack maintained in a computer-readable medium for recording event execution information and process hierarchy of the distributed computer network;
   if the first event is allowed to be published to the event subscriber, publishing the first event to the event subscriber and pushing a first entry to the service entry stack indicating that the first event is now published to the event subscriber;
   recording the first entry in the service entry stack via a state change in the computer-readable medium;
   wherein the service entry stack retains execution information related to the published event, thereby enhancing the security for event publication.

2. The method of claim 1 further comprising publishing, by the event system, a second event to a first group of security subscribers including at least one security manager determining whether the publisher is authorized to publish the first event.

3. The method of claim 1 if the first event is allowed to be published further comprising:
   calling a service event handler for the event subscriber to publish the first event;
   pushing one or more entries to the service entry stack representing one or more events executed and triggered by publishing the first event to the event subscriber;
   returning the service event handler back to the event system when there are no more events triggered by the published first event; and
   popping the first entry out from the service entry stack.

4. A method for enhancing network security by using a service entry stack in a distributed computer network, the method comprising:
   receiving, by an event system, an indication for publishing a first event to a subscriber list of one or more event subscribers by a publisher;
   publishing, by the event system, a second event to a first group of security subscribers including at least one security manager determining whether the publisher is authorized to publish the first event, the second event containing the subscription list;
   examining authorization concerns and publishing the first event to each event subscriber of the subscriber list by sequentially examining each event subscriber in the subscriber list, the examining further comprising:
      evaluating, by the event system, whether an event subscriber is authorized to receive the first event;
      publishing, by the event system, a third event to a second group of security subscribers including at least one security manager determining whether there are authorization concerns for publishing the first event;
      if the first event is allowed to be published to the event subscriber, pushing a first entry to the service entry stack indicating that the first event is now published to the event subscriber;
      calling a service event handler for the event subscriber to publish the first event;
      pushing one or more entries to the service entry stack representing one or more events executed and triggered by publishing the first event to the event subscriber;
      returning the service event handler back to the event system when there are no more events triggered by the published first event; and
      popping the first entry out from the service entry stack,
   wherein the service entry stack helps to reflect a process hierarchy of the distributed computer network and retains execution information related to the published event on a computer-readable storage medium, thereby enhancing the security for event publication.

5. An event system in a distributed computer network using a service entry stack for enhancing network security, the system comprising:
   an examining module on a first computer system in the distributed computer network for, after receiving an indication for publishing, by a publisher, a first event to a subscriber list of one or more event subscribers, examining authorization concerns for publishing the first event to each event subscriber;
   a service entry stack for recording event execution information and process hierarchy of the distributed computer network while the examining module of the event system sequentially examining each event subscriber in the subscriber list, wherein at least one event subscriber is on a second computer system in the distributed computer network;
   editing the subscriber list to enforce security criteria for each event subscriber; and
   a publishing module for publishing the first event to the event subscriber if it is authorized to receive the first event;
   wherein if the first event is allowed to be published to the event subscriber, the service entry stack receives information related to the published event, the execution information including an indication that the first event is now published to the event subscriber.

6. The system of claim 5 further comprising means for publishing, by the event system, a second event to a first group of security subscribers including at least one security manager determining whether the publisher is authorized to publish the first event.

7. The system of claim 5 if the first event is allowed to be published further comprising means for:
   calling a service event handler for the event subscriber to publish the first event;
   pushing one or more entries to the service entry stack representing one or more events executed and triggered by publishing the first event to the event subscriber;
   returning the service event handler back to the event system when there are no more events triggered by the published first event; and
   popping the first entry out from the service entry stack.

8. A system for enhancing network security by using a service entry stack in a distributed computer network including a plurality of computers, the system comprising:
- receiving, by an event system on a first computer system in the distributed computer network, an indication for publishing a first event to a subscriber list of one or more event subscribers by a publisher, wherein at least one event subscriber is on a second computer system in the distributed computer network;
- publishing, by the event system, a second event to a first group of security subscribers including at least one security manager determining whether the publisher is authorized to publish the first event, the second event containing the subscription list;
- examining authorization concerns and publishing the first event to each event subscriber of the subscriber list by sequentially examining each event subscriber in the subscriber list, the examining further comprising means for:
    - evaluating, by the event system, whether an event subscriber is authorized to receive the first event;
    - publishing, by the event system, a third event to a second group of security subscribers including at least one security manager determining whether there are authorization concerns for publishing the first event;
    - if the first event is allowed to be published to the event subscriber, pushing a first entry to the service entry stack indicating that the first event is now published to the event subscriber;
    - calling a service event handler for the event subscriber to publish the first event;
    - pushing one or more entries to the service entry stack representing one or more events executed and triggered by publishing the first event to the event subscriber;
    - returning the service event handler back to the event system when there are no more events triggered by the published first event; and
    - popping the first entry out from the service entry stack,
- wherein the service entry stack helps to reflect a process hierarchy of the distributed computer network and retains execution information related to the published event, thereby enhancing the security for event publication.

9. A computer-readable storage medium comprising computer-interpretable instructions that, when executed by a computer:
- receive, by an event system, an indication for publishing, by a publisher, a first event to a subscriber list of one or more event subscribers;
- examine authorization concerns for publishing the first event to each event subscriber by sequentially examining each event subscriber in the subscriber list utilizing a service entry stack for recording event execution information and process hierarchy of the distributed computer network;
- publish the first event to the event subscriber if it is authorized to receive the first event; and
- updating the service entry stack with the first event and first event security information;
- wherein the first event security information includes an indication that the first event is now published to the event subscriber; and
- wherein the service entry stack retains execution information related to the published event, thereby enhancing the security for event publication.

10. The computer-readable medium of claim 9 wherein the computer-interpretable instructions further include instructions that, when executed by a computer, publish, by the event system, a second event to a first group of security subscribers including at least one security manager determining whether the publisher is authorized to publish the first event.

11. The computer-readable medium of claim 9 wherein the computer-interpretable instructions further include instructions that, when executed by a computer, if the first event is allowed to be published:
- call a service event handler for the event subscriber to publish the first event;
- push one or more entries to the service entry stack representing one or more events executed and triggered by publishing the first event to the event subscriber;
- return the service event handler back to the event system when there are no more events triggered by the published first event; and
- pop the first entry out from the service entry stack.

12. A computer-readable storage medium comprising computer-interpretable instructions that, when executed by a computer:
- receive, by an event system, an indication for publishing a first event to a subscriber list of one or more event subscribers by a publisher;
- publish, by the event system, a second event to a first group of security subscribers including at least one security manager determining whether the publisher is authorized to publish the first event, the second event containing the subscription list;
- examine authorization concerns and publish the first event to each event subscriber of the subscriber list by sequentially examining each event subscriber in the subscriber list, the examining further comprising instructions for:
    - evaluating, by the event system, whether an event subscriber is authorized to receive the first event;
    - publishing, by the event system, a third event to a second group of security subscribers including at least one security manager determining whether there are authorization concerns for publishing the first event;
    - if the first event is allowed to be published to the event subscriber, pushing a first entry to the service entry stack indicating that the first event is now published to the event subscriber;
    - calling a service event handler for the event subscriber to publish the first event;
    - pushing one or more entries to the service entry stack representing one or more events executed and triggered by publishing the first event to the event subscriber;
    - returning the service event handler back to the event system when there are no more events triggered by the published first event; and
    - popping the first entry out from the service entry stack,
- wherein the service entry stack helps to reflect a process hierarchy of the distributed computer network and retains execution information related to the published event, thereby enhancing the security for event publication.

* * * * *